(12) United States Patent
Azadet et al.

(10) Patent No.: US 6,192,072 B1
(45) Date of Patent: Feb. 20, 2001

(54) PARALLEL PROCESSING DECISION-FEEDBACK EQUALIZER (DFE) WITH LOOK-AHEAD PROCESSING

(75) Inventors: Kameran Azadet, Middletown; Meng-Lin Yu, Morganville, both of NJ (US)

(73) Assignee: Lucent Technologies Inc., Murray Hll, NJ (US)

( * ) Notice: Under 35 U.S.C. 154(b), the term of this patent shall be extended for 0 days.

(21) Appl. No.: 09/326,781

(22) Filed: Jun. 4, 1999

(51) Int. Cl.[7] .............................. H03H 7/30; H03H 7/40; H03K 5/159
(52) U.S. Cl. ............................................ 375/233; 708/323
(58) Field of Search .............................. 375/233; 708/323

(56) References Cited

U.S. PATENT DOCUMENTS 5,027,369 * 6/1991 Kuenast ................................ 375/233
5,642,382 * 6/1997 Juan ..................................... 375/232

OTHER PUBLICATIONS

G.A. Clark, S.K. Mitra and S.R. Parker, "Block Implementation of Adaptive Digital Filters", Transactions on ASSP, Jun. 1981. vol. ASSP–29, No. 3.
A. Gatherer and T.H.–Y. Meng, "High Sampling Rate Adaptive Decision Feedback Equalizers", Proc. of ICASSP, 1990, pp. 1593–1596.
K. Parhi, "Pipelining in Algorithim with Quantizer Loops", IEEE Transactions on Circuits and Systems, Jul. 1991, vol. 38, No. 7, pp. 745–754.

* cited by examiner

Primary Examiner—Don N. Vo
Assistant Examiner—Phuong Phu
(74) Attorney, Agent, or Firm—Ryan, Mason & Lewis, LLP

(57) ABSTRACT

A method and apparatus are disclosed for increasing the effective processing speed of a parallel decision-feedback equalizer (DFE) by combining block processing and look-ahead techniques in the selection (multiplexing) stage. The present invention extends a parallel DFE by using look-ahead techniques in the selection stage to precompute the effect of previous blocks on each subsequent block, and to thereby remove the serial output dependency. The parallel DFE includes a multiplexor tree structure that selects an appropriate output value for each block and precomputes the effect of previous blocks on each subsequent block. A multiplexing delay algorithm on the order of logN is employed to resolve the output dependency and thus speeds up parallel block processing DFEs. The disclosed DFE architecture can be combined with pipelining to completely eliminate the critical path problem. Pipelining reduces the required critical path timing to one multiplexing time. The disclosed multiplexor tree circuitry for the parallel DFE groups multiplexor blocks into groups of two, referred to as block pairs, and provides at least one multiplexor for each block, i, to select an output value, $y_i$, from among the possible precomputed values. The output of each parallel block depends on the possible precomputed values generated by the look-ahead processors for the block, as well as the actual values that are ultimately selected for each previous block. In order to reduce the delay in obtaining each actual output value, the present invention assumes that each block contains each possible value, and carries the assumption through to all subsequent blocks. Thus, the number of multiplexors required to select from among the possible values grows according to $N \cdot logN$, where N is the block number.

35 Claims, 5 Drawing Sheets

PARALLEL PROCESSING DECISION-FEEDBACK EQUALIZER (DFE) WITH LOOK-AHEAD PROCESSING

FIELD OF THE INVENTION

The present invention relates generally to channel equalization techniques, and more particularly, to decision-feedback equalizers (DFEs) employing parallel (block) processing.

BACKGROUND OF THE INVENTION

Signals arriving at a receiver are typically corrupted by intersymbol interference (ISI), crosstalk, echo, and other noise. Thus, receivers must jointly equalize the channel, to compensate for such intersymbol interference (ISI) and other distortions, and decode the encoded signals at increasingly high clock rates. Decision-feedback equalization (DFE) is a widely-used technique for removing intersymbol interference where noise enhancement caused by a linear feed-forward equalizer (FFE) may introduce performance problems. For a detailed discussion of decision feedback equalizers (DFEs), see, for example, R. Gitlin et al., Digital Communication Principles, (Plenum Press 1992) and E. A. Lee and D. G. Messerschmitt, Digital Communications, (Kluwer Academic Press, 1988), each incorporated by reference herein. Generally, decision-feedback equalization utilizes a nonlinear equalizer to equalize the channel using a feedback loop based on previously decided symbols. Since DFE techniques are nonlinear, the DFE process does not enhance the channel noise.

In many high-speed applications, such as Fast Ethernet 100BASE-TX, mass storage, Gigabit Ethernet, or Synchronous Optical Networks (SONET), the symbol rates are high. For example, the Fast Ethernet 100BASE-TX standard uses a clock rate of 125 MHz. Thus, the equalization and decoding computations performed by the DFE must be performed at a clock period of 8 nanoseconds. Other advanced data networking applications, such as the SONET standard, may require even shorter clock periods. In many cases, such a short clock period makes the implementation of a DFE challenging or infeasible and forms the critical path in their implementation.

A number of methods have been proposed or suggested for speeding up the DFE processing. For example, K. Parhi, "Pipelining in Algorithm with Quantizer Loops". *IEEE Transactions on Circuits and Systems*, Vol. 38, No. 7, 745–54 (July 1991), incorporated by reference herein, proposes a look-ahead architecture. Generally, a look-ahead DFE implementation transforms the original DFE feedback loop into a look-ahead structure (with duplicate DFEs for each possible value) and a simple loop with only a large selection multiplexor and one memory device. The look-ahead technique precomputes the symbol value for each possible variation, then utilizes the multiplexor to select the appropriate symbol when the actual value is determined. The complexity of the look-ahead implementation is $M^L$, where M is the size of symbol alphabet, and L is the number of coefficient taps in the DFE. The speed of the look-ahead method is limited by a select-and-latch operation in the transformed simple loop.

Block (parallel) processing techniques have also been proposed for speeding up adaptive filters for high-speed communication applications. For a discussion of block processing techniques, see, for example, G. A. Clark et al., "Block Implementation of Adaptive Digital Filters", Trans. on ASSP, Vol. ASSP-29, No. 3, (June 1981), incorporated by reference herein. Generally, block processing increases the throughput of the system by processing several inputs (made available through proper buffering) in one clock cycle using duplicated hardware. In return, the clock speed can be set at a lower and more feasible speed. For example, if ten inputs are processed in the same clock cycle, the processing clock speed can be lowered to ten percent (10%) of the clock speed of the received signal, while maintaining the same throughput.

While block processing techniques effectively reduce the required processing speed for general adaptive filter applications, block processing cannot easily be directly used with DFEs because of an output dependency in the feedback loop of DFEs. In the feedback loop of a DFE, each output depends on previous output values that may not be available from the previous cycle. As apparent from the above-described deficiencies with conventional DFEs, a need exists for a technique that reduces the output dependency and further speeds up DFE processing. U.S. patent application Ser. No. 09/206,527, filed Dec. 7, 1998, entitled "A Parallel Processing Decision-Feedback Equalizer (DFE)," assigned to the assignee of the present invention and incorporated by reference herein (hereinafter referred to as "the Azadet 7-4 System"), discloses a parallel implementation of a DFE that speeds up DFE processing. While the Azadet 7-4 System employs look-ahead techniques in each of a plurality of parallel blocks to achieve performance gains, the output dependencies in the disclosed parallel DFE nonetheless produce a delay on the order of N, where N is the number of blocks.

SUMMARY OF THE INVENTION

Generally, a method and apparatus are disclosed for increasing the effective processing speed of a parallel decision-feedback equalizer (DFE) by combining block processing and look-ahead techniques in the selection (multiplexing) stage. The parallel DFE of the Azadet 7-4 System receives a plurality of symbol blocks in parallel using a plurality of corresponding input branches and utilizes look-ahead techniques within a given block to precompute all possible output values for the given block. The present invention extends the Azadet 7-4 System by using look-ahead techniques in the selection stage to precompute the effect of previous blocks on each subsequent block, and to thereby remove the serial output dependency.

The present invention reduces the delay in the critical path for parallel DFEs by employing block processing and look-ahead techniques in the selection (multiplexing) stage to select the actual output values from among the generated possible values. According to one aspect of the invention, the parallel DFE includes a multiplexor tree structure that selects an appropriate output value for each block and precomputes the effect of previous blocks on each subsequent block. A multiplexing delay algorithm on the order of logN is employed to resolve the output dependency and thus speeds up parallel block processing DFEs.

According to another aspect of the invention, the disclosed DFE architecture can be combined with pipelining to completely eliminate the critical path problem. The present invention permits a pipeline implementation of the disclosed multiplexor array circuit, because there are no dependencies from one row of the multiplexor array to another row and the select signal, $y_0$, is needed only at the bottom row of multiplexors. Pipeline latches can be added after any row of multiplexors in the multiplexor array circuit and each pipelined segment of the multiplexor array can be processed simultaneously. The number of pipeline segments that can be formed is between 2 and logN, where N is the number of parallel blocks.

The disclosed multiplexor tree circuitry for the parallel decision-feedback equalizer (DFE) groups multiplexor blocks into groups of two, referred to as block pairs, and provides at least one multiplexor for each block, i, to select an output value, $y_i$, from among the possible precomputed values. In addition, block pairs are also progressively grouped into block groups, such that the first block group has one block pair, the second block group has two block pairs, and so on. The output of each parallel block depends on the possible precomputed values generated by the look-ahead processors for the block, as well as the actual values that are ultimately selected for each previous block. In order to reduce the delay in obtaining each actual output value, the present invention assumes that each block contains each possible value, and carries the assumption through to all subsequent blocks. Thus, the number of multiplexors required to select from among the possible values grows according to N·logN, where N is the block number.

For example, the first block is not influenced by previous blocks and requires only one multiplexor to select from among the possible precomputed values. The output of the second parallel block depends on the possible precomputed values generated by the look-ahead processors for the second block, as well as the actual values that are ultimately selected for the first block. Thus, the second block includes a multiplexor for processing each of the assumed possible values of the first block (selection signal), with each multiplexor receiving the possible precomputed values generated by the look-ahead processors for the second block as inputs. In addition, the second block includes a final multiplexor for selecting the final output value, $Y_2$. The inputs to the final multiplexor for the second block are also applied as inputs to multiplexors in the second block group (blocks three and four). The second block group is processed in a similar manner, and the inputs to the final multiplexor for the fourth block are also applied as inputs to multiplexors in the next block group comprised of the third and fourth block pair (blocks five through eight).

A more complete understanding of the present invention, as well as further features and advantages of the present invention, will be obtained by reference to the following detailed description and drawings.

DETAILED DESCRIPTION

The present invention speeds up DFE processing by combining block processing and look-ahead techniques in the selection stage to produce a delay on the order of logN. A block processing DFE with a block factor of N takes N inputs and produces N outputs in parallel. Since each output computation depends on previous decisions, the computation of the N outputs forms a dependency chain in block processing DFEs and generally requires a multiplexing delay time of N−1 when block processing is done sequentially. The present invention employs a multiplexing delay algorithm on the order of logN to resolve the output dependency and thus speeds up parallel block processing DFEs.

The output of each parallel block depends on the possible precomputed values generated by the look-ahead processors for the block, as well as the actual values that are ultimately selected for each previous block. In order to reduce the delay in obtaining each actual output value, the present invention assumes that each block contains each possible value, and carries the assumption through to all subsequent blocks. Thus, the number of multiplexors required in each block to select from among the possible values grows according to N·logN, where N is the block number. A novel multiplexor tree architecture selects the actual output vales with a significantly reduced delay. As soon as the possible values are computed, the output is selected through multiplexing.

The disclosed decision-feedback equalizer (DFE) architecture groups multiplexor blocks into groups of two, and provides one or more multiplexors for each possible precomputed value to ultimately compute the output values, y, independently and concurrently. The DFE is comprised of a tree of multiplexors, and a transform operation, discussed below, is applied to non-overlapping neighboring multiplexor pairs, in parallel. A transformed pair is treated as a single multiplexor with multiple outputs and is again grouped into neighboring pairs. This transform and group-in-pairs operation can then be repeated, and the select signals closest to the beginning of the dependency chain will double its direct control distance each time. By properly grouping the original N multiplexors in a tree fashion and repeatedly using the "transform" operation, the entire dependency chain can be computed in D plus one steps, where D is the tree depth and is equal to logN (because the select signal propagates a distance of $2^{logN}$ equal to N).

DECISION-FEEDBACK EQUALIZERS (DFEs)

Figure 1:
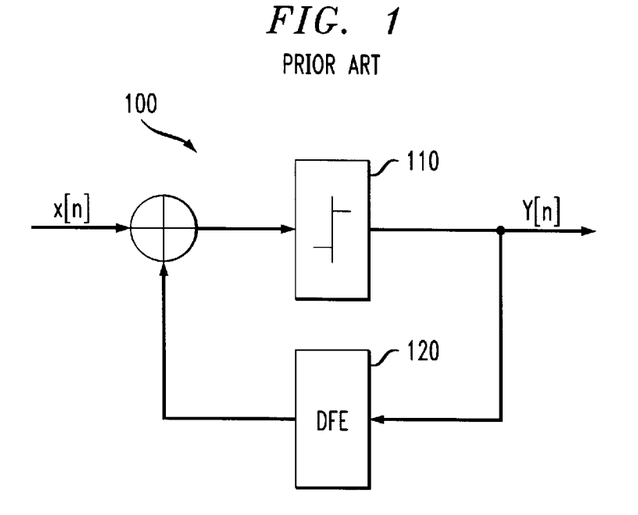
FIG. 1 illustrates a conventional decision-feedback equalizer (DFE) structure.

FIG. 1 illustrates a conventional DFE structure 100. The DFE filter output is $$z[n] = \sum_{k=1}^{L} w_{-k} y[n-k],$$

where L is the length of the filter and $w_{-k}$ is the kth tap weight. Thus, the output of the slicer 110 can be expressed as:

$$y[n] = Q\left(x[n] + \sum_{k=1}^{L} w_{-k} y[n-k]\right), \quad (1)$$

where the function, Q, is a nonlinear function employed by the slicer 110, mapping signals to symbol alphabets $\{\alpha_i\}$ for $0 \leq i < M$. Equation 1 leads to a straightforward implementation, namely, at clock cycle n, when x[n] is available and all previous y[n−k], for all k>0 are already computed and known, the equation can be evaluated during the given clock period.

MULTIPLEXOR TERMINOLOGY

Generally, a multiplexor function is represented as $m(i_0, i_1, \ldots, i_{N-1}; s_0, s_1, \ldots s_{n-1})$, where $S_k$ indicates the select signals of the multiplexor, $i_k$ indicates the data inputs, and $N=2^n$. If the unsigned binary number $s_{n-1}s_{n-2} \ldots s_0$ represents a number j, then the output of the multiplexor function, $m(i_0, i_1, \ldots, i_{N-1}; s_0, s_1, \ldots s_n)$, is $i_j$. The two neighboring multiplexors, m1 and m2, shown in FIG. 2A, can be represented as $m1(i_0^1, i_1^1, \ldots, i_{N-1}^1; s_0^1, s_1^1, \ldots s_{n-1}^1)$ and $m2(i_0^2, i_1^2, \ldots, i_{N-1}^2; s_0^2, s_1^2, \ldots s_{n-1}^2)$, where $s_i^2 = s_{i+1}^1$, for $0 \leq i \leq N-2$ and $s_{n-1}^2 = m1(\;)$.

Figure 2A:
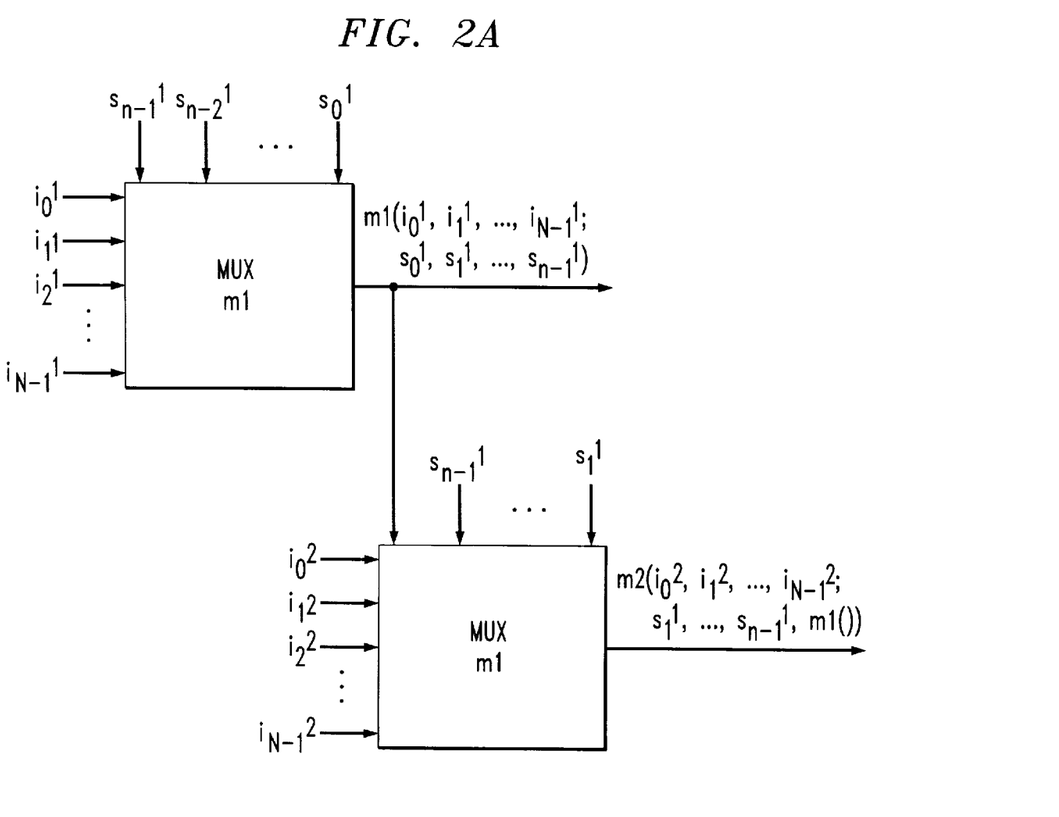
FIG. 2A illustrates two neighboring multiplexors m1 and m2, where the output of m1 is connected to the select input of m2.
Figure 2B:
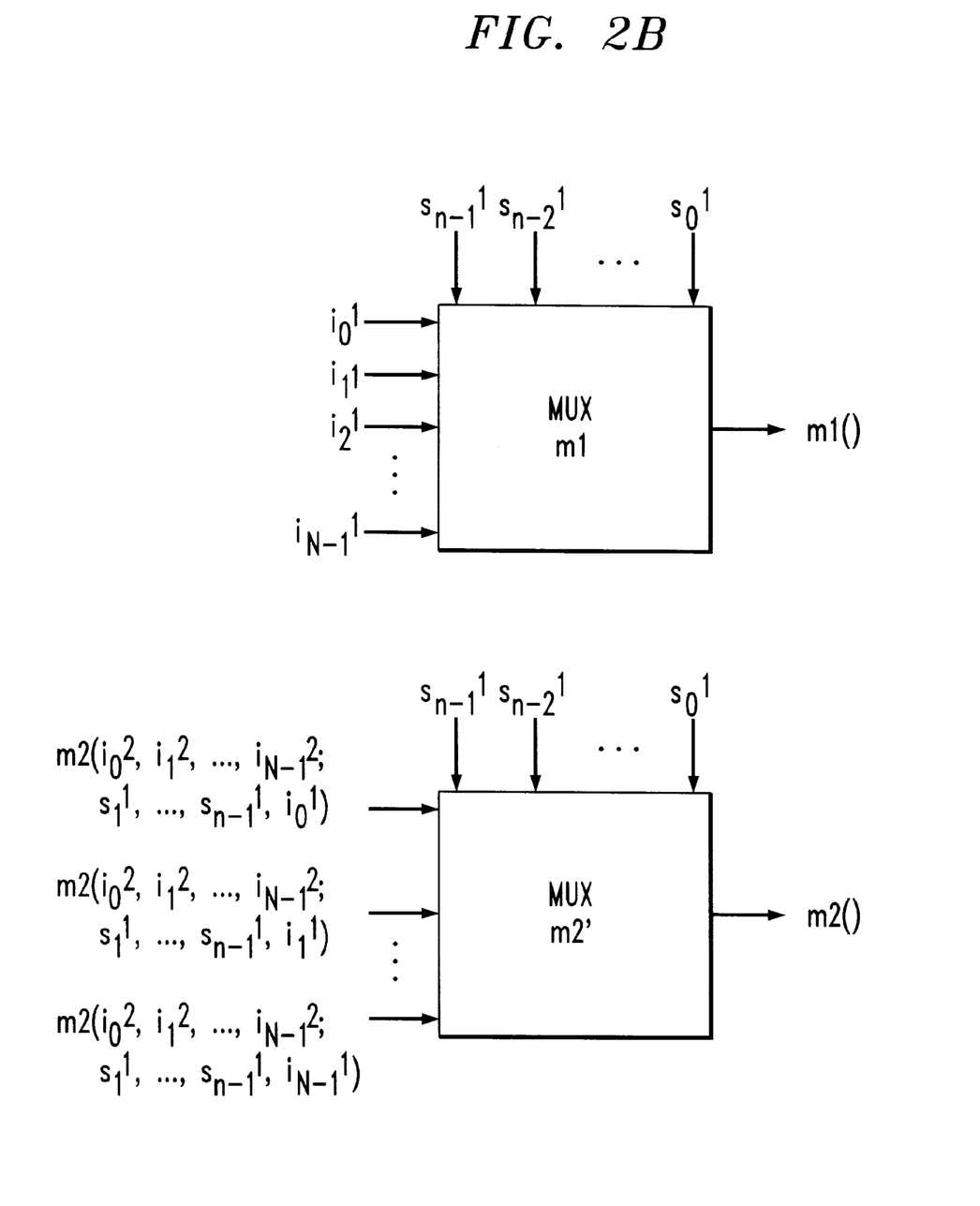
FIG. 2B illustrates the transformation of the multiplexor m2 of FIG. 2A in accordance with the present invention, such that all possible values are precomputed and applied to the multiplexor m2' for selection by the select signal of multiplexor m1.

FIG. 2A illustrates two neighboring multiplexors m1 and m2, where the output of m1 is connected to the select input of m2. According to a feature of the present invention, the structure of m2 is transformed by creating multiple copies of m2, with one copy for each of the possible output values of m1. The correct output of m2 is then selected using the select signal of m1. As shown in FIG. 2B, the transform operation changes the multiplexor function of m2 to $m2'(m2(i_0^2, i_1^2, \ldots, i_{N-1}^2; s_1^2, \ldots s_{n-2}^2, i_0^1), m2(i_0^2, i_1^2, \ldots, i_{N-1}^2; s_1^2, \ldots s_{n-2}^2, i_1^1), \ldots, m2(i_0^2, i_1^2, \ldots, i_{N-1}^2; s_1^2, \ldots s_{n-2}^2, i_{n-1}^1); s_0^1, s_1^1, \ldots s_{n-1}^1)$. The multiplexor m2' is consistent with original function the multiplexor m2. The transformation from m2 to m2' can be viewed as propagating the control/select signals of m1 to m2 through one multiplexor delay. In addition, the transformation from m2 to m2' can also be viewed as doubling the distance under the direct control of the select signals of m1. In this manner, all the possible values are precomputed and applied to the multiplexor m2' and the appropriate value is selected (as opposed to computed) using the select signal of multiplexor mil.

As discussed further below in conjunction with FIG. 4, the transform operation can be applied to non-overlapping neighboring multiplexor pairs in parallel. A transformed pair can then be treated as a single multiplexor with multiple outputs and again be grouped into neighboring pairs. This transform and group-in-pairs operation can then be repeated, and the select signals closest to the beginning of the dependency chain will double its direct control distance each time. By properly grouping the original N multiplexors in a tree fashion and repeatedly using the "transform" operation discussed above in conjunction with FIGS. 2A and 2B, the entire dependency chain can be computed in D steps, where D is the tree depth and is equal to logN (because the select signal propagates a distance of $2^{logN} = N$).

Figure 3:
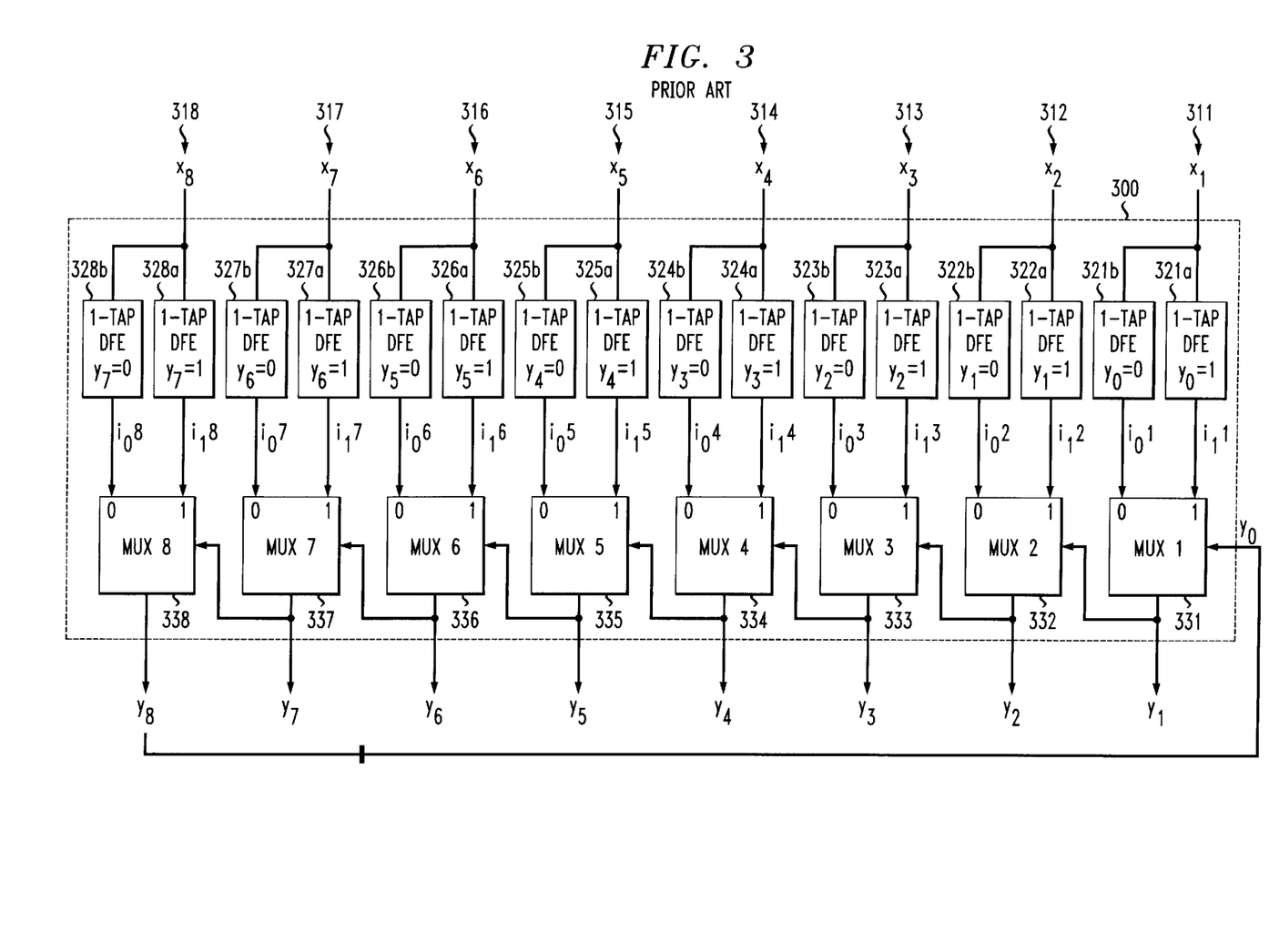
FIG. 3 illustrates a conventional block processing implementation of a decision-feedback equalizer (DFE), where the number of parallel blocks is eight.

FIG. 3 provides a conceptual representation for a block processing implementation of a decision-feedback equalizer (DFE) 300, such as the implementation of the Azadet 7-4 System, where the number of parallel blocks 311–318 is eight. Thus, if the clock rate of the received signal is C, the processing clock rate of the decision-feedback equalizer (DFE) 300 can be C/8. The illustrative DFE 300 shown in FIG. 3 is an implementation for k=1 tap, with M=2 possible values (levels) for each symbol or bit.

As shown in FIG. 3, each parallel block 311–318 of the decision-feedback equalizer (DFE) 300 includes a single tap decision-feedback equalizer (DFE), such as the DFEs 321-a, 321-b for the first block 311, for precomputing each of the possible output values, $y_i$. Thereafter, the possible precomputed values are applied to the corresponding iN data inputs of a multiplexor 331–338 for each block 311–318. In the illustrative implementation, a two-level (binary) signaling scheme is employed. Thus, as shown in FIG. 3, the two possible values from the look-ahead decision-feedback equalizers (DFE) at each block, such as the DFEs 321-a, 321-b for the first block 310, corresponding to the two possible values (0/1) of $y_i$, are applied to the corresponding $i_0$ and $i_1$ inputs of each multiplexor 311–318. Once the actual value, $y_i$, of a given block 311–318 is determined, the actual value is applied to the select signal of the multiplexor i+1 (for the next block), to select the appropriate next symbol or bit for the next block $y_{i+1}$.

Figure 4:
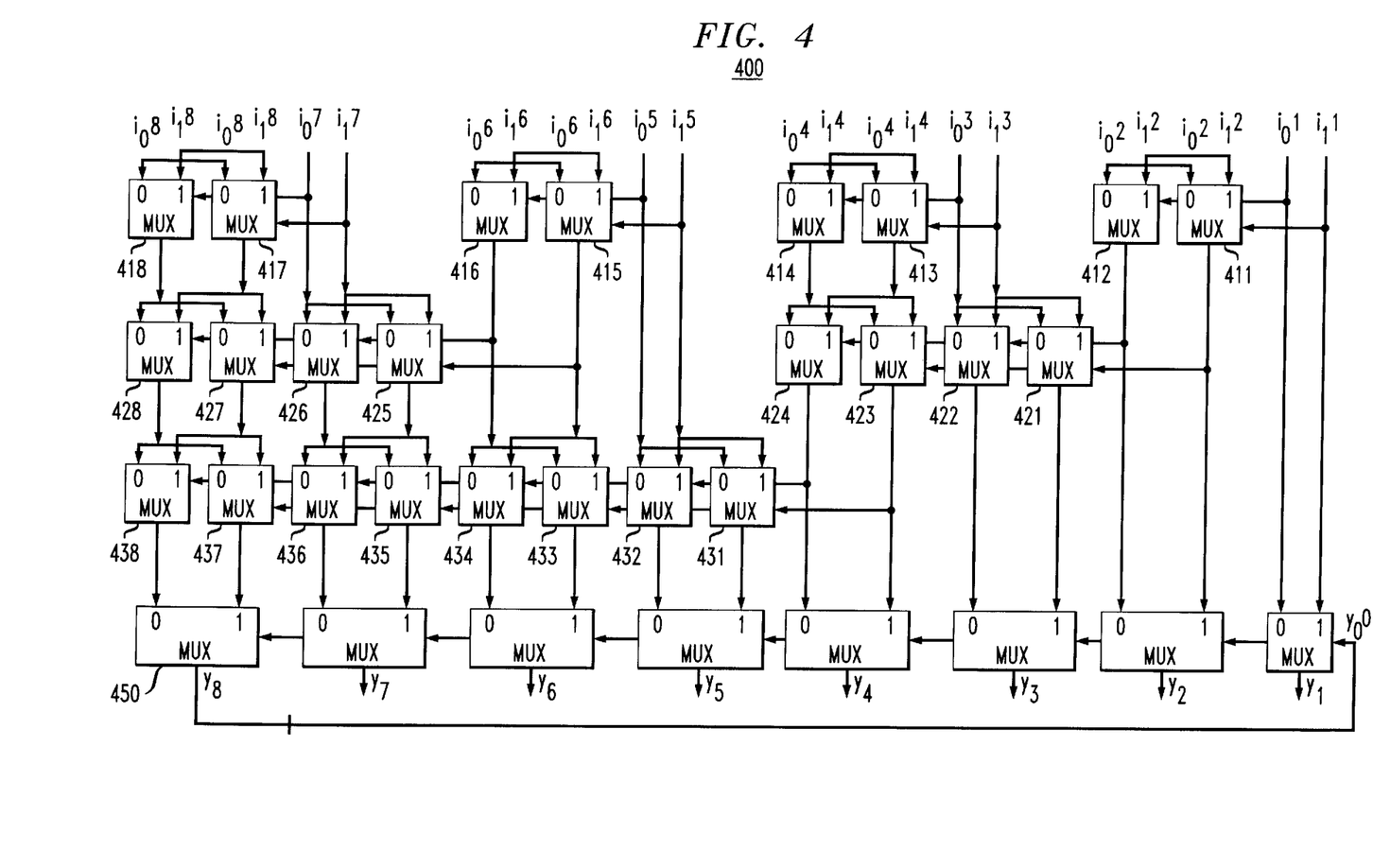
FIG. 4 illustrates a multiplexor tree array in accordance with the present invention for the parallel decision-feedback equalizer (DFE) of FIG. 3 to produce a delay on the order of logN.

FIG. 4 illustrates a multiplexor array circuit 400 in accordance with the present invention that utilizes block processing and look-ahead techniques in the selection (multiplexing) stage to produce a delay on the order of logN. The illustrative multiplexor array circuit 400 shown in FIG. 4 is an implementation for k=1 tap, with M=2 possible values (levels) for each symbol or bit. The multiplexor array circuit 400 of FIG. 4 groups the multiplexors 331–338 of FIG. 3 into groups of two, and provides an array of multiplexors, in a manner described further below, for selecting the appropriate precomputed value for each block pair independently and concurrently. Thus, the $i_0^1$ and $i_1^1$ inputs of block 311 are grouped with the $i_0^2$ and $i_1^2$ inputs of block 312, as shown in FIG. 4. Likewise, the $i_0^3$ and $i_1^3$ inputs of block 313 are grouped with the $i_0^4$ and $i_1^4$ inputs of block 314 ($i_0^5$ and $i_1^5$ inputs are grouped with $i_0^6$ and $i_1^6$ inputs, and $i_0^7$ and $i_1^7$ inputs are grouped with $i_0^8$ and $i_1^8$ inputs in a similar manner).

As shown in FIG. 4, the transform operation of the present invention is applied to non-overlapping neighboring multiplexor pairs, in parallel. A transformed pair is treated as a single multiplexor with multiple outputs and is again grouped into neighboring pairs. This transform and group-in-pairs operation can then be repeated, and the select signals closest to the beginning of the dependency chain, such as $y_0$ in FIG. 4, will double its direct control distance each time. By properly grouping the original N multiplexors 311–318 in a tree fashion and repeatedly using the "transform" operation discussed above in conjunction with FIGS. 2A and 2B, the entire dependency chain can be computed in D steps, where D is the tree depth and is equal to logN (because the select signal propagates a distance of $2^{logN}$ equal to N).

The output of block 311 (FIG. 3) is determined by the two possible values $i_0^1$ and $i_1^1$ and the select signal, $y_0^0$. The output of each subsequent block 312–318 (FIG. 3) is determined by the two possible input values $i_0^j$ and $i_1^j$ and the output of the previous block 311–317. The present invention utilizes look-ahead techniques in the selection stage to produce a delay on the order of logN.

In the following discussion of FIG. 4, it is assumed that all multiplexing operations take an equal amount of time. At a time, t, equal to 0, when all $i_0$'s and $i_1$'s are available it is not known whether $i_0^k$ or $i_1^k$ will be chosen, for k=1 through 8. The present invention, however, utilizes the fact that either $i_0^k$ or $i_1^k$ will be the final correct value. Initially, for each independent block pair, the correct value is assumed to be $i_1^k$ ($i_1^1, i_1^3, i_1^5, i_1^7$), and the $i_1^k$ value is applied to the corresponding multiplexors 411, 413, 415, 417 in the first row of each block pair, as shown in FIG. 4. The $i_1^k$ value selects $i_0^2$ or $i_1^2$ for multiplexor 411, $i_0^4$ or $i_1^4$ for multiplexor 413, $i_0^6$ or $i_1^6$ for multiplexor 415, and $i_0^8$ or $i_1^8$ for multiplexor 417.

In addition, for each independent block pair, the alternate correct value (in the two-level illustration) is also assumed to be $i_0^k$ ($i_0^1, i_0^3, i_0^5, i_0^7$), and the $i_0^k$ value is applied to the corresponding multiplexors 412, 414, 416, 417 in the first row of each block pair, as shown in FIG. 4. The $i_0^k$ value selects $i_0^2$ or $i_1^2$ for multiplexor 412, $i_0^4$ or $i_1^4$ for multiplexor 414, $i_0^6$ or $i_1^6$ for multiplexor 416, and $i_0^8$ or $i_1^8$ for multiplexor 418.

Therefore, at a time, t, equal to one multiplexor delay time, for each block pair (i) the output of the multiplexors 411, 413, 415, 417 contain the correct output value if the corresponding $i_1^1, i_1^3, i_1^5, i_1^7$ value is the correct value, or (ii) the output of the multiplexors 412, 414, 416, 418 contain the correct output value if the corresponding $i_0^1, i_0^3, i_1^5, i_0^7$ value is the correct value. The outputs of the multiplexors 411, 412 represent the possible values of output $Y_2$ of the block 312 (FIG. 3). It is also noted that even though which assumption is correct remains unknown, the choice of which multiplexor for each block pair in the first row contains the correct value no longer depends on the output value of the preceding block y1, y3, y5, y7. The duplicated multiplexing for each possible precomputed value provided by the present invention allows the choice of which multiplexor for each block pair in the first row containing the correct value to depend solely on $y_0$. In other words, the distance (selections) under the direct control of $y_0$ is doubled from 1 to 2 blocks (for outputs $y_1$ and $y_2$).

Similarly, in processing the second row of multiplexors 421–428 in FIG. 4, which of multiplexors 411 or 412 for the first block pair or multiplexors 415 or 416 for the third block pair contains the final correct value remains unknown. Initially, it is assumed that multiplexors 411 and 415 contain the correct value and the corresponding value is applied to multiplexors 421 and 423 in the second block pair and multiplexors 425 and 427 in the fourth block pair. At the same time, it is assumed that multiplexors 412 and 416 contain the correct value and the corresponding value is applied to multiplexors 422 and 424 in the second block pair and multiplexors 426 and 428 in the fourth block pair.

Therefore, at a time, t, equal to two multiplexor delay times, if the multiplexor 411 contains the correct value (which in turn means the $i_1^1$ value is the correct value), the output of the multiplexor 411 selects the outputs of the multiplexors 421 and 423 as the $y_3$ and $y_4$ outputs. Likewise, if the multiplexor 412 contains the correct value (which in turn means the $i_0^1$ value is the correct value), the output of the multiplexor 412 selects the outputs of the multiplexors 422 and 424 as the $y_3$ and $y_4$ outputs. The output of multiplexor 421 and 422 represent the possible values of output $y_3$ of the block 313 (FIG. 3). The output of multiplexor 423 and 424 represent the possible values of output $y_4$ of the block 314 (FIG. 3). The choices for y1, y2, y3, y4 at this point are solely determined by $y_0$. In other words, the distance under the direct control of $y_0$ is doubled to 4 blocks. Similarly, at a time, t, equal to three multiplexor delay times, all eight output values are directly controlled (selected) by $y_0$, with the selection being performed by the last row of multiplexors.

Figure 5:
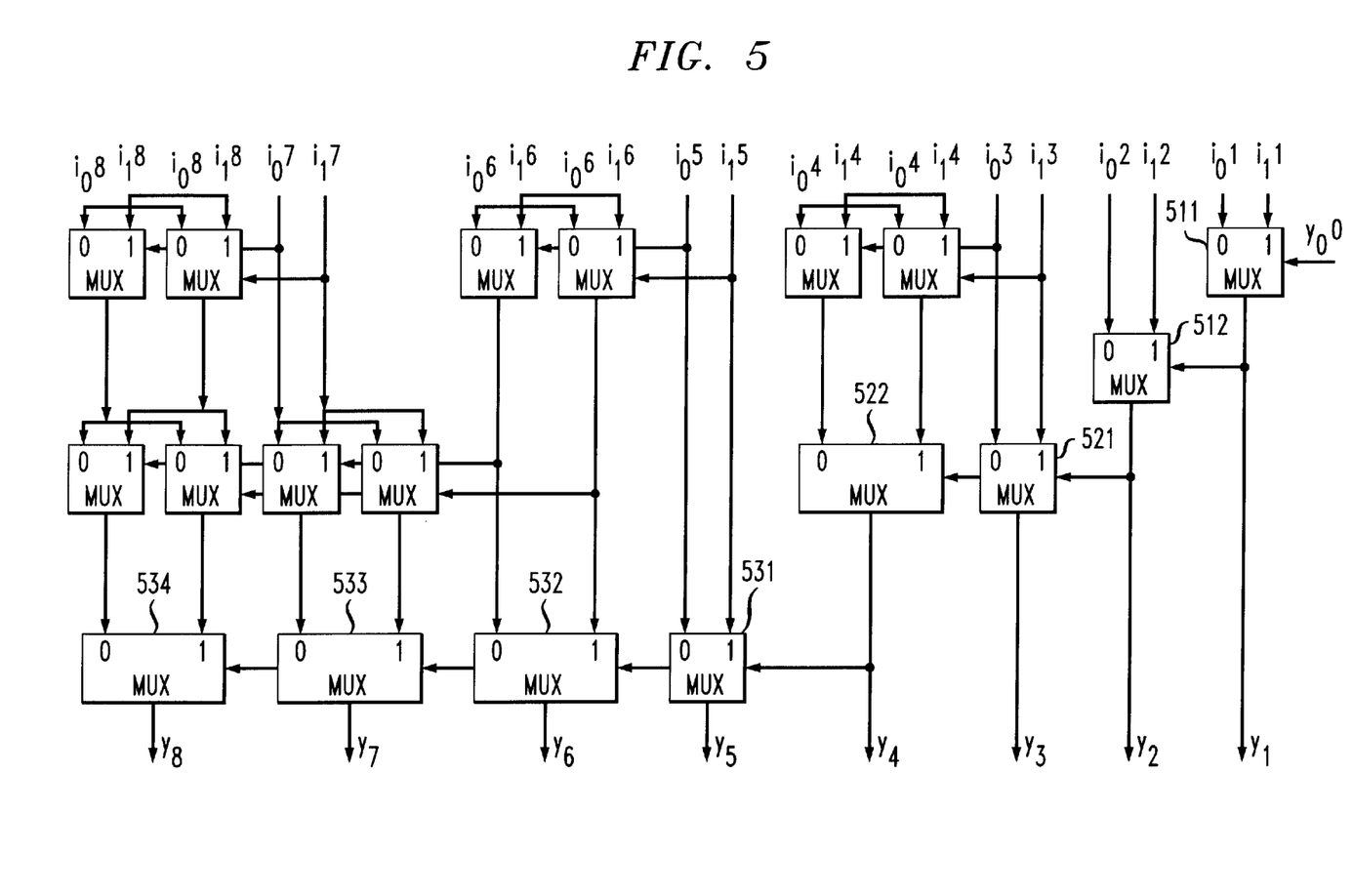
FIG. 5 illustrates an alternate implementation of the multiplexor tree array of FIG. 4 in accordance with the present invention having a delay on the order of logN and reduced complexity.

FIG. 5 illustrates a decision-feedback equalizer (DFE) 500 in accordance with the present invention having a delay on the order of logN. The multiplexor array circuit 500 of FIG. 5 is a simplified version of the multiplexor array circuit 400 of FIG. 4. The first multiplexor 511 of the multiplexor array circuit 500 selects the correct value for the first stage. The simplified architecture is achieved by a utilizing a multiplexor 511 at the first stage, controlled by the select signal $y_0^0$.

The complexity of the multiplexor array circuit 500 (FIG. 5) is logN*N−N+2 multiplexors, compared with a complexity of N*logN+N for the multiplexor array circuit 400 of FIG. 4. Savings are more significant for small N.

The architecture of the multiplexor array circuit 400 of FIG. 4 lends itself to a pipeline implementation, because the select signals, $y_0$, are needed only at the bottom row of multiplexors 450. In addition to a traditional pipeline implementation of the speculative FIR filters, pipeline latches can be added after any row of multiplexors in the multiplexor array circuit 400 of FIG. 4. Specifically, since there are no dependencies from one row of the multiplexor array 400 to another row, pipeline latches can be added after any row of multiplexors in the multiplexor array circuit 400 of FIG. 4. Thus, each segment of the multiplexor array 400 can be processed simultaneously. The number of pipeline segments that can be formed is between 2 and logN. In one implementation, the multiplexor array 400 is divided into two segments after the second row of multiplexors, utilizing pipelining techniques. When logN segments are used, the architecture has the most relaxed critical path timing constraint, with just a single multiplexor delay plus one register latch delay. It is noted that while the critical path seems to be equal to that of a traditional look-ahead implementation, such as those described in K. Parhi, "Pipelining in Algorithm with Quantizer Loops". *IEEE Transactions on Circuits and Systems*, Vol. 38, No. 7, 745–54 (July 1991), incorporated by reference above, the clock is operated at a reduced frequency of f/N. The DFE architecture shown in FIGS. 4 and 5 thus allows DFEs to operate at a very high speed. In theory, the architecture of the present invention removes the limit on how fast a DFE can operate.

It is to be understood that the embodiments and variations shown and described herein are merely illustrative of the principles of this invention and that various modifications may be implemented by those skilled in the art without departing from the scope and spirit of the invention. For example, while the invention has been illustrated with a binary implementation using 2-level signals, the present invention can be easily generalized to multi-level signals.

We claim:

1. A method for equalizing a signal received from a dispersive channel, said method comprising the steps of:
   receiving a plurality of symbol blocks in parallel;
   computing all possible values of a decision feedback signal for each of said corresponding blocks;
   providing a multiplexor array for processing said possible values for each of said blocks and the possible values for any previous blocks on each subsequent block; and
   selecting an output value for each of said blocks using said multiplexor array.

2. The method of claim 1, wherein said multiplexor array selects an appropriate output value for each block and processes the effect of previous blocks on each subsequent block.

3. The method of claim 1, wherein pairs of multiplexors in said multiplexor array are grouped into block pairs.

4. The method of claim 3, wherein each of said block pairs provides at least one multiplexor for each of said blocks, i, to select an output value, $y_i$, from among the possible precomputed values.

5. The method of claim 1, wherein said multiplexor array is produced by (i) transforming non-overlapping neighboring multiplexor pairs in said multiplexor array, in parallel, (ii) treating each transformed multiplexor pair as a single multiplexor with multiple outputs, and (iii) again grouping said effective single multiplexors into neighboring pairs.

6. The method of claim 1, wherein said multiplexor array assumes that each block contains each possible value, and carries said assumed possible values through to all subsequent blocks.

7. The method of claim 1, wherein the number of multiplexors in each block of said multiplexor array grows according to N·logN, where N is the block number.

8. The method of claim 1, further comprising the step of utilizing pipeline techniques to simultaneously process various segments of said multiplexor array.

9. A decision-feedback equalizer (DFE) for equalizing a signal received on a plurality of parallel blocks from a dispersive channel, comprising:

at least one look-alhead processor for computing possible output values of a decision feedback signal for each of said corresponding blocks; and a multiplexor array for selecting an output value for each of said blocks from said possible values for each of said blocks and wherein said multiplexor array employs look-ahead techniques to precompute the effect of previous blocks on each subsequent block.

10. The decision-feedback equalizer (DFE) of claim 9, wherein said multiplexor array selects an appropriate output value for each block and processes the effect of previous blocks on each subsequent block.

11. The decision-feedback equalizer (DFE) of claim 9, wherein pairs of multiplexors in said multiplexor array are grouped into block pairs.

12. The decision-feedback equalizer (DFE) of claim 11, wherein each of said block pairs provides at least one multiplexor for each of said blocks, i, to select an output value, $y_i$, from among the possible precomputed values.

13. The decision-feedback equalizer (DFE) of claim 9, wherein said multiplexor array is produced by (i) transforming non-overlapping neighboring multiplexor pairs in said multiplexor array, in parallel, (ii) treating each transformed multiplexor pair as a single multiplexor with multiple outputs, and (iii) again grouping said effective single multiplexors into neighboring pairs.

14. The decision-feedback equalizer (DFE) of claim 9, wherein said multiplexor array assumes that each block contains each possible value, and carries said assumed possible values through to all subsequent blocks.

15. The decision-feedback equalizer (DFE) of claim 9, wherein the number of multiplexors in each block of said multiplexor array grows according to N·logN, where N is the block number.

16. The decision-feedback equalizer (DFE) of claim 9, wherein pipeline techniques are employed to simultaneously process various segments of said multiplexor array.

17. The decision-feedback equalizer (DFE) of claim 16, wherein pipeline latches are provided after at least one row of said multiplexor array and each pipelined segment of the multiplexor array can be processed simultaneously.

18. A decision-feedback equalizer (DFE) for equalizing a signal received on a plurality of parallel blocks from a dispersive channel, comprising:

at least one look-ahead processor for computing possible output values of a decision feedback signal for each of said corresponding blocks; and a multiplexor array for selecting an output value for each of said blocks, wherein said multiplexor array employs look-ahead techniques to precompute the effect of previous blocks on each subsequent block.

19. The decision-feedback equalizer (DFE) of claim 18, wherein said multiplexor array selects an appropriate output value for each block and processes the effect of previous blocks on each subsequent block.

20. The decision-feedback equalizer (DFE) of claim 18, wherein pairs of multiplexors in said multiplexor array are grouped into block pairs.

21. The decision-feedback equalizer (DFE) of claim 20, wherein each of said block pairs provides at least one multiplexor for each of said blocks, i, to select an output value, $y_i$, from among the possible precomputed values.

22. The decision-feedback equalizer (DFE) of claim 18, wherein said multiplexor array is produced by (i) transforming non-overlapping neighboring multiplexor pairs in said multiplexor array, in parallel, (ii) treating each transformed multiplexor pair as a single multiplexor with multiple outputs, and (iii) again grouping said effective single multiplexors into neighboring pairs.

23. The decision-feedback equalizer (DFE) of claim 18, wherein said multiplexor array assumes that each block contains each possible value, and carries said assumed possible values through to all subsequent blocks.

24. The decision-feedback equalizer (DFE) of claim 18, wherein the number of multiplexors in each block of said multiplexor array grows according to N·logN, where N is the block number.

25. The decision-feedback equalizer (DFE) of claim 18, wherein pipeline techniques are employed to simultaneously process various segments of said multiplexor array.

26. The decision-feedback equalizer (DFE) of claim 25, wherein pipeline latches are provided after at least one row of said multiplexor array and each pipelined segment of the multiplexor array can be processed simultaneously.

27. A method for equalizing a signal received from a dispersive channel, said method comprising the steps of:

receiving a plurality of symbol blocks in parallel;

computing all possible values of a decision feedback signal for each of said corresponding blocks; and selecting an output value for each of said blocks using look-ahead techniques to precompute the effect of previous blocks on each subsequent block.

28. The method of claim 27, wherein said selecting step selects an appropriate output value for each block and processes the effect of previous blocks on each subsequent block.

29. The method of claim 27, wherein said selecting step is performed using a multiplexor array.

30. The method of claim 29, further comprising the step of providing at least one multiplexor for each of said blocks, i, to select an output value, $y_i$, from among the possible precomputed values.

31. The method of claim 27, further comprising the step of performing said selecting step using a multiplexor array produced by (i) transforming non-overlapping neighboring multiplexor pairs in said multiplexor array, in parallel, (ii) treating each transformed multiplexor pair as a single multiplexor with multiple outputs, and (iii) again grouping said effective single multiplexors into neighboring pairs.

32. The method of claim 27, wherein said selecting step assumes that each block contains each possible value, and carries said assumed possible values through to all subsequent blocks.

33. The method of claim 27, further comprising the step of utilizing pipeline techniques to simultaneously process various segments of said multiplexor array.

34. A decision-feedback equalizer (DFE) for equalizing a signal received on a plurality of parallel blocks from a dispersive channel, comprising:

means for receiving a plurality of symbol blocks in parallel;

means for computing all possible values of a decision feedback signal for each of said corresponding blocks;

means for providing a multiplexor array for processing said possible values for each of said blocks and wherein said multiplexor array employs look-ahead techniques to precompute the effect of previous blocks on each subsequent block; and means for selecting an output value for each of said blocks using said multiplexor array.

35. A decision-feedback equalizer (DFE) for equalizing a signal received on a plurality of parallel blocks from a dispersive channel, comprising:

means for receiving a plurality of symbol blocks in parallel;

means for computing all possible values of a decision feedback signal for each of said corresponding blocks; and means for selecting an output value for each of said blocks using look-ahead techniques to precompute the effect of previous blocks on each subsequent block.

* * * * *